US011974109B2

(12) United States Patent
Boyd et al.

(10) Patent No.: US 11,974,109 B2
(45) Date of Patent: Apr. 30, 2024

(54) MEMS DEVICE

(71) Applicant: AAC ACOUSTIC TECHNOLOGIES (SHENZHEN) CO., LTD., Shenzhen (CN)

(72) Inventors: Euan James Boyd, Eb (GB); Scott Lyall Cargill, Eb (GB)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 96 days.

(21) Appl. No.: 17/826,185

(22) Filed: May 27, 2022

(65) Prior Publication Data

US 2023/0388714 A1 Nov. 30, 2023

(51) Int. Cl.

| | |
|---|---|
| ***H04R 7/12*** | (2006.01) |
| ***H04R 1/08*** | (2006.01) |
| ***H04R 7/16*** | (2006.01) |

(52) U.S. Cl.

CPC ................. *H04R 7/12* (2013.01); *H04R 1/08* (2013.01); *H04R 7/16* (2013.01); *H04R 2201/003* (2013.01)

(58) Field of Classification Search

CPC ... H04R 7/12; H04R 1/08; H04R 7/16; H04R 2201/003

See application file for complete search history.

(56) References Cited

U.S. PATENT DOCUMENTS

| | | | | |
|---|---|---|---|---|
| 2015/0001647 A1* | 1/2015 | Dehe | ...................... | H04R 31/00 257/416 |
| 2020/0213797 A1* | 7/2020 | Meng | ..................... | H04R 19/04 |

* cited by examiner

*Primary Examiner* — Sunita Joshi

(74) *Attorney, Agent, or Firm* — W&G Law Group

(57) ABSTRACT

Provided is an MEMS device, including: a base, a rear cavity; a vibrating diaphragm, the vibrating diaphragm including an upper diaphragm and a lower diaphragm, and an accommodation space being formed between the upper and lower diaphragms; a counter electrode arranged in the accommodation space; and supporting members concentrically arranged and spaced apart. The supporting members are arranged between the upper and lower diaphragms and are spaced apart from the counter electrode, two opposite ends of each supporting member are connected to the upper and lower diaphragms, and at least one of the supporting members is provided with first cavities. An upper ventilation hole and a lower ventilation hole are respectively formed at a position of the upper diaphragm and a position of the lower diaphragm corresponding to one of the first cavities; and the upper ventilation hole, the first cavity and the lower ventilation hole communicate with each other.

11 Claims, 6 Drawing Sheets

MEMS DEVICE

TECHNICAL FIELD

The present invention relates to the technical field of micro-electromechanical systems, in particular to an MEMS device.

BACKGROUND

In the related art, a microphone having double-diaphragm structure has been developed, and such a microphone includes two diaphragms at two opposite sides of a counter electrode. In this case, an accommodation space that can be sealed is formed between the two diaphragms, which can have different pressures to the external environment. If the pressure in the accommodation space is reduced, this structure will significantly reduce self-noise associated with the counter electrode (i.e., a main noise source in the MEMS microphone).

In the related art, a ventilation hole is formed at a center of each of the two diaphragms and passes through the counter electrode, therefore, it may cause possible stress concentration of an overall structure under high-pressure load, and affect the rigidity of the overall structure.

SUMMARY

The purpose of the present invention is to provide an MEMS device, aiming to solve the technical problems in the related art.

An embodiment of the present invention provides an MEMS device, including: a base, a rear cavity passing through the base; a vibrating diaphragm, connected to the base and covering the rear cavity, the vibrating diaphragm including an upper diaphragm and a lower diaphragm opposite to each other, and an accommodation space being formed between the upper diaphragm and the lower diaphragm; a counter electrode arranged in the accommodation space; and supporting members concentrically arranged and spaced apart from each other. The supporting members are arranged between the upper diaphragm and the lower diaphragm and are spaced apart from the counter electrode, two opposite ends of each of the supporting members are connected to the upper diaphragm and the lower diaphragm, and at least one of the supporting members is provided with first cavities. An upper ventilation hole is formed at a position of the upper diaphragm corresponding to one of the first cavities, and a lower ventilation hole is formed at a position of the lower diaphragm corresponding to one of the first cavities; and the upper ventilation hole, the first cavity and the lower ventilation hole communicate with each other.

As an improvement, the upper diaphragm include first protrusions protruding toward the accommodation space and spaced apart from each other, and the lower diaphragm includes second protrusions protruding toward the accommodation space and spaced apart from each other; the supporting members; the first protrusions and the second protrusions are in one-to-one correspondence; two ends of one of the supporting members are connected to the first protrusion and the second protrusion; and the upper ventilation hole is formed in the first protrusion, and the lower ventilation hole is formed in the second protrusion.

As an improvement, the first cavities are formed only in the supporting members positioned at a periphery of the vibrating diaphragm.

As an improvement, an inner diameter of the upper ventilation hole is larger than an inner diameter of the lower ventilation hole.

As an improvement, an inner diameter of the upper ventilation hole is smaller than an inner diameter of the lower ventilation hole.

As an improvement, parts of the upper diaphragm and the lower diaphragm that correspond to the supporting members provided with the first cavities each include a first layer and a second layer; the first layer is closer to the accommodation space than the second layer; the first protrusion is formed at the first layer of the upper diaphragm, and the second protrusion is formed at the first layer of the lower diaphragm; the MEMS device further includes a first through hole and a second through hole respectively passing through the second layer of the upper diaphragm and the second layer of the lower diaphragm; the first through hole, the upper ventilation hole, the first cavity, the lower ventilation hole and the second through hole are connected in sequence; and a diameter of the first through hole is not equal to a diameter of the second through hole.

As an improvement, the diameter of the first through hole and the diameter of the second through hole are each smaller than an inner diameter of the upper ventilation hole, smaller than an inner diameter of the first cavity and smaller than an inner diameter of the lower ventilation hole.

As an improvement, the upper diaphragm and the lower diaphragm are each made of an electric-conductive material or each includes an insulation film provided with an electrode layer or each comprises an insulation film with electric-conductive material doping or implantation.

As an improvement, each of the supporting members includes first arc sections that are concentrically arranged, the first arc sections are spaced apart from each other in an annular direction, the counter electrode is provided with through holes, the first arc sections are respectively accommodated in the through holes and are spaced apart from the counter electrode, and two ends of each of the first arc sections are connected to the upper diaphragm and the lower diaphragm.

As an improvement, the upper ventilation hole, the first cavity, the lower ventilation hole each have the same shape as a corresponding first arc section of the first arc sections.

BRIEF DESCRIPTION OF DRAWINGS

In order to more clearly illustrate technical solutions in embodiments of the present disclosure or in the related art, the accompanying drawings used in the embodiments and in the related art are briefly introduced as follows. It should be noted that the drawings described as follows are merely part of the embodiments of the present disclosure, and other drawings can also be acquired by those skilled in the art without paying creative efforts.

REFERENCE SIGNS

10—base;
11—rear cavity;
20—vibrating diaphragm;
21—upper diaphragm;
211—upper ventilation hole;
22—lower diaphragm;
221—lower ventilation hole;
23—accommodation space;
24—first protrusion;
25—second protrusion;
26—first layer;
27—second layer;
28—first through hole;
29—second through hole;
30—supporting member;
31—first arc section;
32—first cavity;
40—counter electrode.

DESCRIPTION OF EMBODIMENTS

The embodiments described in the following with reference to the drawings are exemplary, and are merely used to illustrate the present invention and do not limit the scope of the present invention.

First Embodiment

Figure 1:
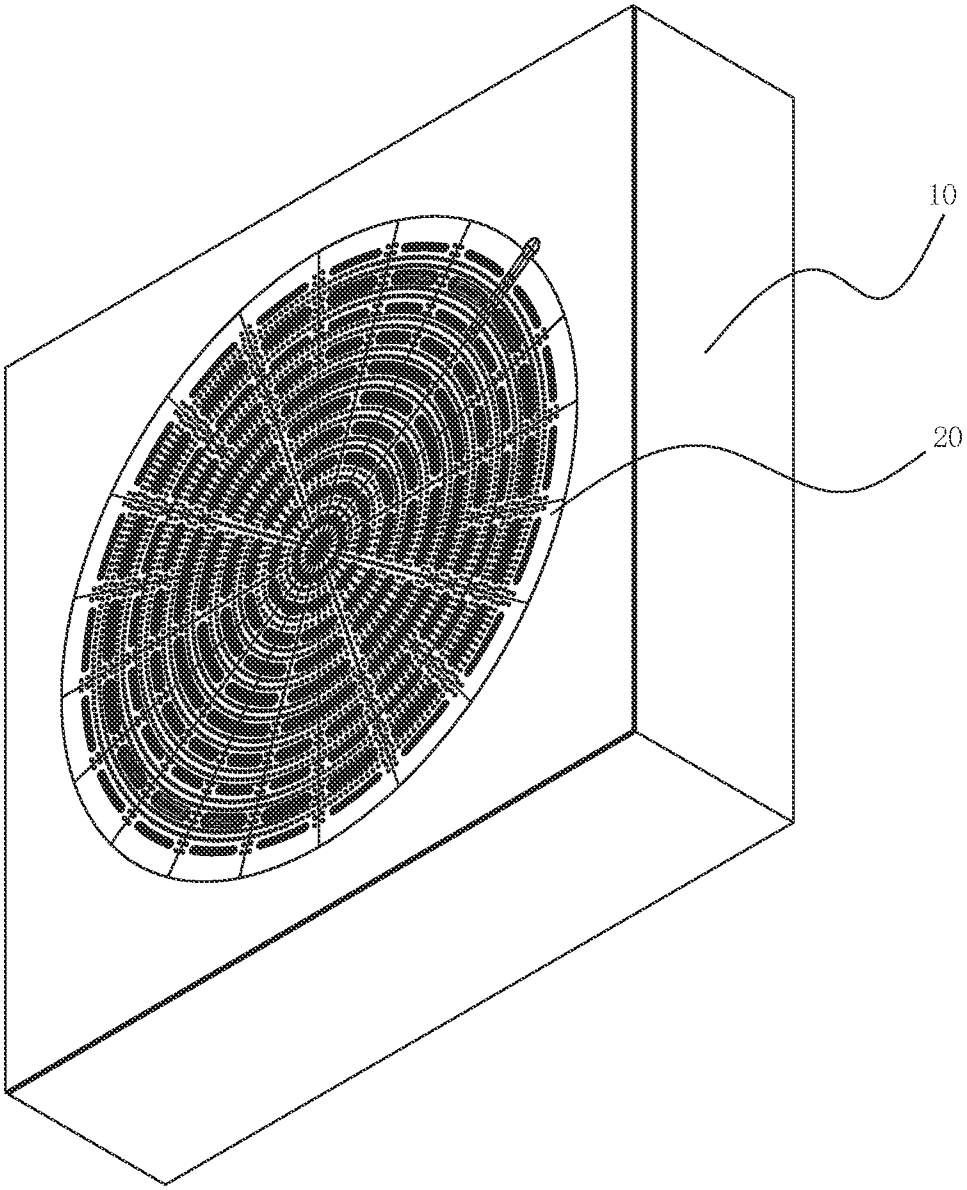
FIG. 1 is a perspective view of an MEMS device according to a first embodiment of the present invention.
Figure 2:
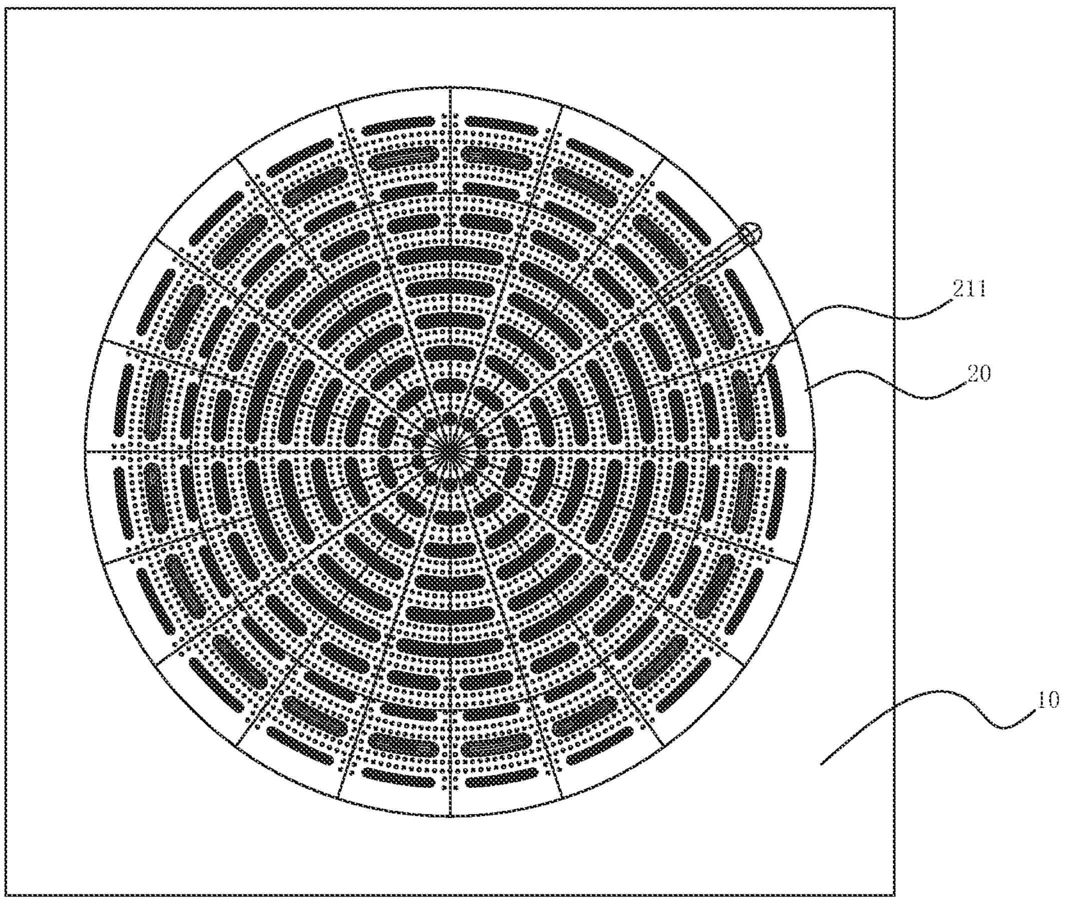
FIG. 2 is a top view of an MEMS device according to a first embodiment of the present invention.

FIG. 1 is a perspective view of an MEMS device according to a first embodiment of the present invention; FIG. 2 is a top view of an MEMS device according to a first embodiment of the present invention; and FIG. 3 is a schematic diagram of a layout structure of an upper ventilation hole and a lower ventilation hole according to a first embodiment of the present invention.

Figure 3:
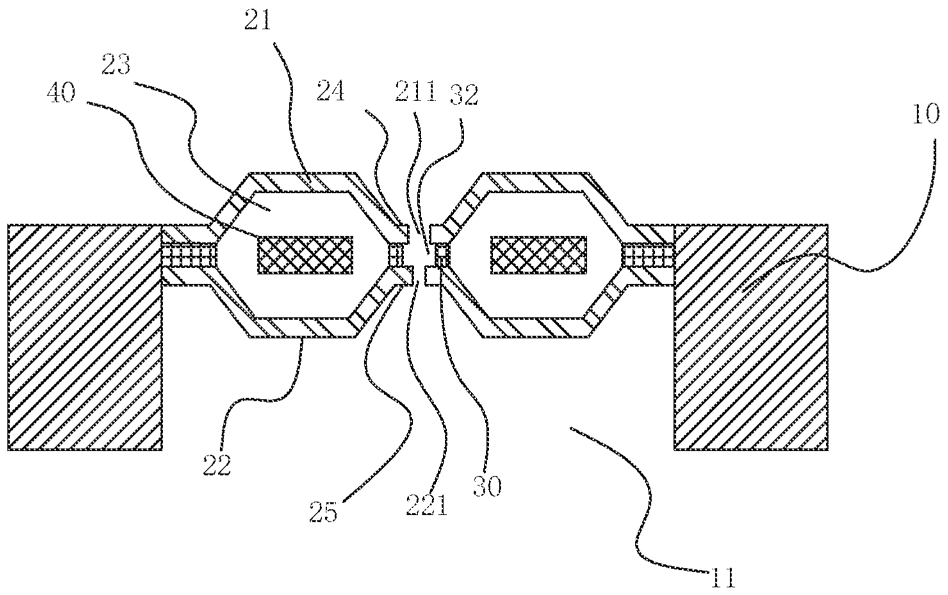
FIG. 3 is a schematic diagram of a layout structure of an upper ventilation hole and a lower ventilation hole according to a first embodiment of the present invention.

As shown in FIG. 1 to FIG. 3, an embodiment of the present invention provides an MEMS device, including a base 10, a vibrating diaphragm 20, supporting members 30 and a counter electrode 40.

A rear cavity 11 passes through the base 10 and in an example, an inner contour surface of the rear cavity 11 has a circular groove structure.

The vibrating diaphragm 20 is connected to the base 10 and covers the rear cavity 11. The vibrating diaphragm 20 includes an upper diaphragm 21 and a lower diaphragm 22 that are opposite to each other. In an embodiment, the upper diaphragm 21 and the lower diaphragm 22 are concentrically arranged circular structures, and a preset distance is formed between the upper diaphragm 21 and the lower diaphragm 22 to form an accommodation space 23. The lower diaphragm 22 is located below the upper diaphragm 21.

In an embodiment of the present invention, the accommodation space 23 is hermetically sealed, and an internal pressure of the accommodation space 23 is smaller than an external atmospheric pressure. Herein, the internal pressure of the accommodation space 23 is smaller than 0.1 atm. In an example, the internal pressure of the accommodation space 23 is equal to 0.1 atm. In another example, the accommodation space 23 is vacuum.

The counter electrode 40 is arranged in the accommodation space 23 in a suspended state. In a normal state, the counter electrode 40 does not contact the upper diaphragm 21 and the lower diaphragm 22, and forms no mechanical coupling with a supporting member 30. A first capacitance is formed between the upper diaphragm 21 and the counter electrode 40, and a second capacitance is formed between the lower diaphragm 22 and the counter electrode 40. In response to a pressure applied on the upper diaphragm 21 and the lower diaphragm 22, the upper diaphragm 21 and the lower diaphragm 22 can move relative to the corresponding counter electrode 40, thereby changing the distance between the upper diaphragm 21 and the lower diaphragm 22 and the corresponding counter electrode 40, thereby causing a change of the capacitance, and thus an electrical signal is accordingly outputted.

The supporting members 30 are concentrically arranged and spaced apart from each other, and are disposed in the accommodation space 23 and spaced apart from the counter electrode 40. The supporting members 30 are spaced apart along a radial direction of the vibrating diaphragm 20 with a center of the vibrating diaphragm 21 as the center. Several first cavities 32 are formed in at least in one of the supporting members 30. In an example, the first cavity 32 is only formed in the supporting member 30 located at a periphery of the vibrating diaphragm 20. In this partial area of the supporting member 30, two opposite ends of the supporting member 30 are connected to the upper diaphragm 21 and the lower diaphragm 22 respectively.

The supporting member 30 is configured to keep the upper diaphragm 21 and the lower diaphragm 22 flat, or at least limit/control bending/deformation of the upper diaphragm 21 and the lower diaphragm 22 between the supporting members 30, so as to avoid that the upper diaphragm 22 and the lower diaphragm 23 are folded to each other in a case of a sealed volume of the accommodation space 23 being in a reduced atmospheric pressure and the external environment being in an ambient atmospheric pressure.

The MEMS device includes an upper ventilation hole 211 at the upper diaphragm 21 corresponding to the first cavity 36, and a lower ventilation hole 221 at the lower diaphragm 22 corresponding to the first cavity 36. The upper ventilation hole 211 and the lower ventilation hole 221 communicate with each other through the first cavity 32 to form a ventilation channel. Compared with a case of the ventilation channel being formed at a center of the vibrating diaphragm 20, this embodiment of the present invention does not decrease the local rigidity of the vibrating diaphragm 20, and can improve the flexibility of the vibrating diaphragm 20 and thus improve the microphone sensitivity.

Controlling the acoustic resistance through the opening formed at the upper diaphragm 21 or at the lower diaphragm 22 allows for a shallower, more controlled etching to control the acoustic resistance. In this way, etching and lithography may be performed on a more uniform topology, thereby simplifying a process and reducing variability.

Placing this first cavity 32 in the supporting member 30 ensures that the local rigidity of this placement area is not changed, while ensuring that the edges of the upper ventilation hole 211, the first cavity 32 and the lower ventilation hole 221 are mechanically supported. In this way, it can avoid a problem of opening of the upper ventilation hole 211, the first cavity 32 and the lower ventilation hole 221 due to inherent stress inside the vibrating diaphragm 20, to cause the acoustic resistance to deviate from the design value.

Further, the upper ventilation hole 211 and the lower ventilation hole 221 are close to an edge of the vibrating diaphragm 20. In an example, the upper ventilation hole 211 and the lower ventilation hole 221 are slit-shaped slots, that is, a length is much larger than a width. In this way, it can avoid a problem of slit opening due to the inherent stress inside the film, to cause the acoustic resistance to deviate from the design value.

With further reference to FIG. 3, the upper diaphragm 21 and the lower diaphragm 22 each have ripple structure, and are each made of an electric-conductive material or an insulating film including an electric-conductive material or an insulation film with electric-conductive material doping or implantation. The upper diaphragm 21 includes first protrusions 24 that protrude toward the accommodation space 23 and are spaced apart from each other. The lower diaphragm 22 includes second protrusions 25 that protrude toward the accommodation space 23 and are spaced apart from each other. The first protrusions 24 and the second protrusions 25 are spaced apart along the radial direction of the vibrating diaphragm 20. The supporting members 30, the first protrusions 24 and the second protrusions 25 are in one-to-one correspondence. Two ends of the supporting member 30 are connected to the first protrusion 24 and the second protrusion 25. The upper ventilation hole 211 is formed at the first protrusion 24, and the lower ventilation hole 221 is formed at the second protrusion 25.

In an example, the shapes and sizes of the first protrusion 24 and the second protrusion 25 are the same, so as to form regular ripples to achieve uniform stress distribution on the entire vibrating diaphragm 20, and make a manufacturing process thereof easier. At the same time, the cross-sectional shapes of the first protrusion 24 and the second protrusion 25 in a direction perpendicular to the vibrating diaphragm 20 can be rectangular, trapezoidal or triangular. An inclined surface of each of the first protrusion 221 and the second protrusion 231 has an angle greater than 0° and smaller than or equal to 90°. Those skilled in the art should know that the cross-sectional shapes of the first protrusion 24 and the second protrusion 25 in the direction perpendicular to the vibrating diaphragm 20 may be regular shapes or irregular shapes, which will not be limited herein.

The first protrusion 24 and the second protrusion 25 together form the ripples of the vibrating diaphragm 20, so that the vibrating diaphragm 20 can have greater tension and thus can withstand greater sound pressure, meanwhile, the vibrating diaphragm 20 can have a smaller internal stress, and the stiffness of the vibrating diaphragm 20 is reduced, effectively improving the mechanical sensitivity of MEMS device 200.

With further reference to FIG. 3, an inner diameter of the upper ventilation hole 211 is larger than an inner diameter of the lower ventilation hole 221. In an example, the inner diameter of the upper ventilation hole 211 is 6 um, and the inner diameter of the lower ventilation hole 221 is 4 um, so as to achieve the best balance between minimizing resistance variation and the size of the pillar. Those skilled in the art should know that the inner diameter of the upper ventilation hole 211 may also be set to be smaller than the inner diameter of the lower ventilation hole 221 or equal to the inner diameter of the lower ventilation hole 221.

Figure 7:
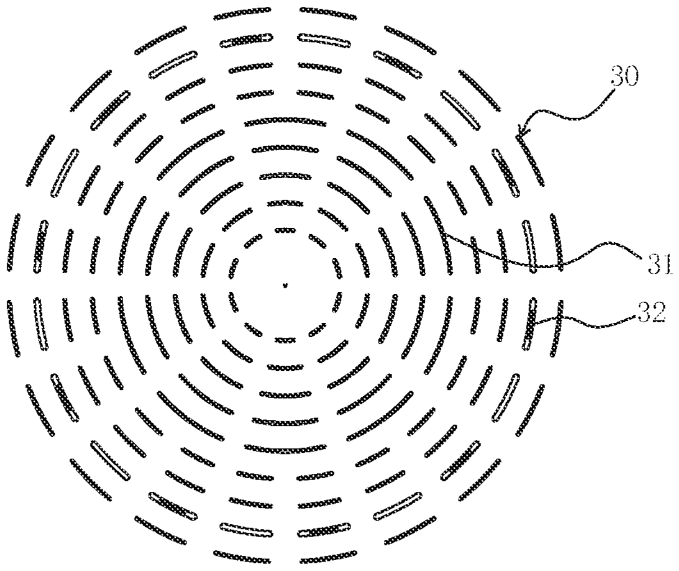
FIG. 7 is a schematic structural diagram of a supporting member according to an embodiment of the present invention.

FIG. 7 is a schematic structural diagram of a supporting member according to an embodiment of the present invention. With reference to FIG. 7, each supporting member 30 includes several first arc sections 31 arranged concentrically. Several first arc sections 31 are spaced apart from each other in an annular direction. Several through holes (not shown) are formed in the counter electrode 40. Several first arc sections 31 are respectively accommodated in several through holes and arranged spaced apart from the counter electrode 40. Two ends of each first arc section 31 are connected to the upper diaphragm 21 and the lower diaphragm 22. A top end of the first arc section 31 is connected to the upper diaphragm 21, and a bottom end of the first arc section 31 is connected to the lower diaphragm 22 after passing through the through hole.

The cross section of the first arc section 31 is an arc structure. The first arc sections 31 of one supporting member 30 have a same inner diameter. The upper ventilation hole 211, the first cavity 32 and the lower ventilation hole 221 have a same shape, which is the same as the corresponding first arc section 32. Several first arc sections 31 are spaced apart from each other in an annular direction. By using a larger first arc section 31 to support the upper diaphragm 21 and lower diaphragm 22, the technical problem of the need to open a large number of through holes in the counter electrode 40 can be solved; the design of the counter electrode 40 is separated from the design of the supporting member 3, meanwhile, the first arc section 31 is much larger than the small cylinder in the related art, so that the column structure of a same aspect ratio is much taller, which makes it possible to use a thicker counter electrode 40, allowing for a stiffer structure, which can significantly improve the stability and reliability of the device.

Referring to FIG. 7, along the radial direction of the vibrating diaphragm 20, the arc lengths of the first arc sections 31 of the supporting members 30 gradually increase. Since the counter electrode 40 does not need to be provided with a through hole at a gap between two adjacent first arc sections 31, the rigidity of the counter electrode 40 can be further increased.

The arc lengths of the first arc sections 31 of the supporting members 30 can increase linearly or non-linearly, that is, the arc lengths of the first arc sections 31 gradually change along a direction from the center of the vibrating diaphragm 20 to the edge of the vibrating diaphragm 20. This can improve the rigidity of the counter electrode 40.

Second Embodiment

Figure 4:
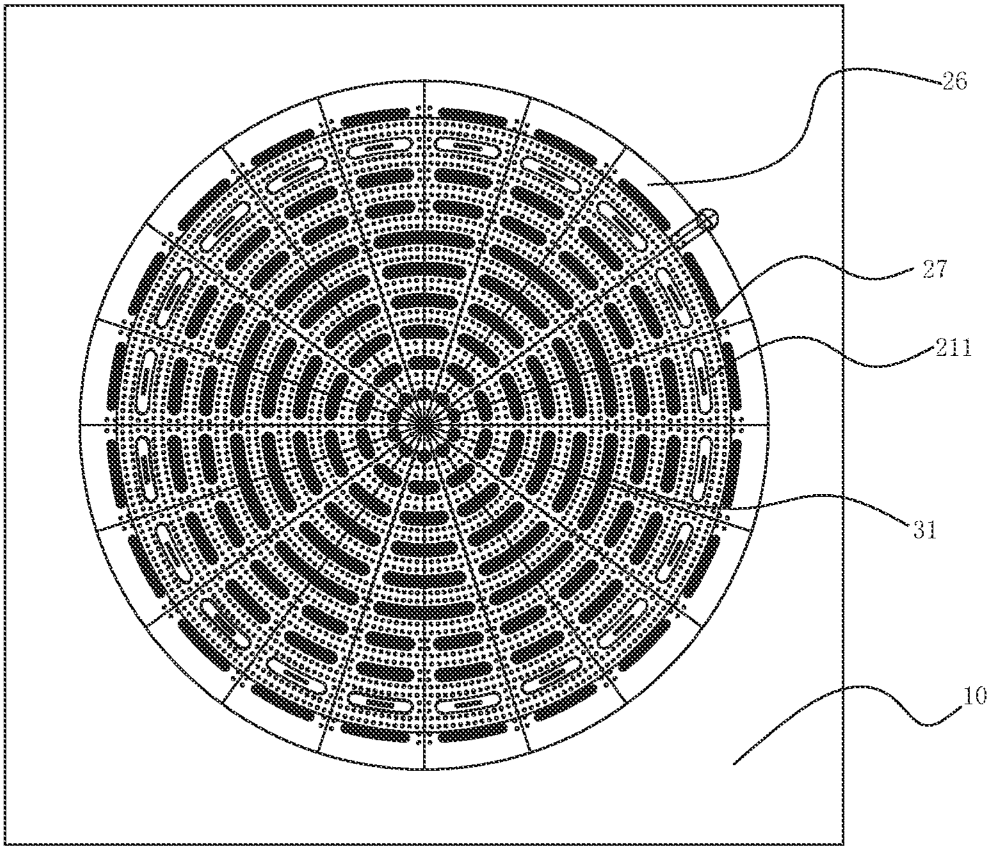
FIG. 4 is a top view of an MEMS device according to a second embodiment of the present invention.
Figure 5:
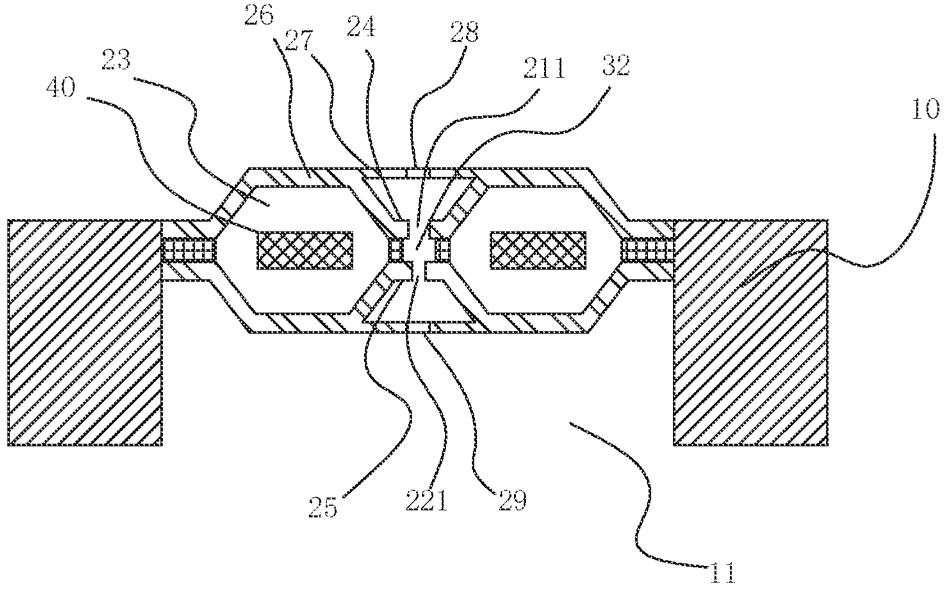
FIG. 5 is a schematic diagram of a layout structure of an upper ventilation hole and a lower ventilation hole according to a second embodiment of the present invention.

With reference to FIG. 4 and FIG. 5, Parts of the upper diaphragm 21 and the lower diaphragm 22 that correspond to the supporting member provided with the first cavities each include a first layer 26 and a second layer 27. The first layer 26 is closer to the accommodation space 23 than the second layer 27. The first layer 26 is an insulation film. The second layer 27 is an electrode layer. In this way, the second layer 27 can be disposed at a position where a movement of the vibrating diaphragm 20 can be most efficiently transferred into electrical signals, thereby increasing the sensitivity of the microphone.

The first protrusion 24 is formed at the first layer 26 of the upper diaphragm 21. The second protrusion 25 is formed at the first layer 26 of the lower diaphragm 22. The MEMS device further includes a first through hole 28 and a second through hole 29 respectively passing through the second layer 27 of the upper diaphragm 21 and the second layer 27 of the lower diaphragm. The first through hole 28, the upper ventilation hole 211, the first cavity 32, the lower ventilation hole 221 and the second through hole 29 are connected in sequence. A diameter of the first through hole 28 is not equal to a diameter of the second through hole 29. In an example, each of the diameter of the first through hole 28 and the diameter of the second through hole 29 is smaller than an inner diameter of the upper ventilation hole 211, an inner diameter of the first cavity 32 or an inner diameter of the lower ventilation hole 221.

With Reference to FIG. 4, in some embodiments, the first layer 26 and the second layer 27 are both disc-shaped structures. The second layer 27 is concentrically located at a center of the first layer 26. In an embodiment, a periphery of the vibrating diaphragm 20 is connected to the base 10, and its deflection is parabolic, which is maximum at the center of the vibrating diaphragm 20 and drops to zero at the edge. Since the sensitivity of the microphone is determined by a ratio of capacitance to pressure change, arranging the second layer 27 at a position where the vibrating diaphragm 20 moves most violently (that is, at the center of the vibrating diaphragm 20) and not at the edge of the vibrating diaphragm 20 can reduce a parasitic capacitance between the upper diaphragm 21 and the lower diaphragm 22, thereby improving the sensitivity of the microphone.

Third Embodiment

Figure 6:
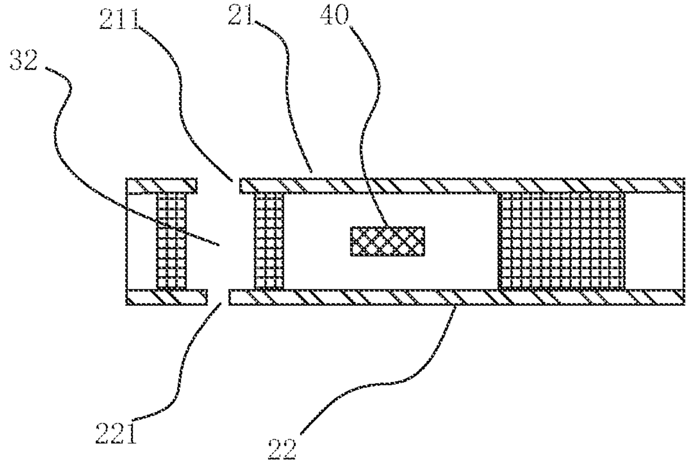
FIG. 6 is a schematic diagram of a layout structure of an upper ventilation hole and a lower ventilation hole according to a third embodiment of the present invention.

The third embodiment differs from the first embodiment in that the upper diaphragm 21 and the lower diaphragm 22 are each a planar structure. FIG. 6 is a schematic diagram of a layout structure of an upper ventilation hole and a lower ventilation hole according to a third embodiment of the present invention, with reference to FIG. 6, the size relationship between the upper ventilation hole 211 and the lower ventilation hole 221 can refer to that described in the first embodiment, and will be further illustrated herein.

The above-described embodiments are merely preferred embodiments of the present disclosure and are not intended to limit the present disclosure. Various changes and modifications can be made to the present disclosure by those skilled in the art. Any modifications, equivalent substitutions and improvements made within the principle of the present disclosure shall fall into the protection scope of the present disclosure.

What is claimed is:

1. An MEMS device, comprising:

a base, a rear cavity passing through the base;

a vibrating diaphragm connected to the base and covering the rear cavity, wherein the vibrating diaphragm comprises an upper diaphragm and a lower diaphragm opposite to each other, and an accommodation space is formed between the upper diaphragm and the lower diaphragm;

a counter electrode arranged in the accommodation space; and supporting members concentrically arranged and spaced apart from each other, wherein the supporting members are arranged between the upper diaphragm and the lower diaphragm and are spaced apart from the counter electrode, two opposite ends of each of the supporting members are connected to the upper diaphragm and the lower diaphragm, and at least one of the supporting members is provided with first cavities, an upper ventilation hole is formed at a position of the upper diaphragm corresponding to one of the first cavities, and a lower ventilation hole is formed at a position of the lower diaphragm corresponding to one of the first cavities; and the upper ventilation hole, the first cavity and the lower ventilation hole communicate with each other; wherein the upper diaphragm comprise first protrusions protruding toward the accommodation space and spaced apart from each other, and the lower diaphragm comprises second protrusions protruding toward the accommodation space and spaced apart from each other; the supporting members; the first protrusions and the second protrusions are in one-to-one correspondence; two ends of one of the supporting members are connected to the first protrusion and the second protrusion; and the upper ventilation hole is formed in the first protrusion, and the lower ventilation hole is formed in the second protrusion.

2. The MEMS device as described in claim 1, wherein the first cavities are formed only in the supporting members positioned at a periphery of the vibrating diaphragm.

3. The MEMS device as described in claim 1, wherein an inner diameter of the upper ventilation hole is larger than an inner diameter of the lower ventilation hole.

4. The MEMS device as described in claim 1, wherein an inner diameter of the upper ventilation hole is smaller than an inner diameter of the lower ventilation hole.

5. The MEMS device as described in claim 1, wherein parts of the upper diaphragm and the lower diaphragm that correspond to the supporting members provided with the first cavities each comprise a first layer and a second layer; the first layer is closer to the accommodation space than the second layer; the first protrusion is formed at the first layer of the upper diaphragm, and the second protrusion is formed at the first layer of the lower diaphragm; the MEMS device further comprises a first through hole and a second through hole respectively passing through the second layer of the upper diaphragm and the second layer of the lower diaphragm; the first through hole, the upper ventilation hole, the first cavity, the lower ventilation hole and the second through hole are connected in sequence; and a diameter of the first through hole is not equal to a diameter of the second through hole.

6. The MEMS device as described in claim 5, wherein the diameter of the first through hole and the diameter of the second through hole are each smaller than an inner diameter of the upper ventilation hole, smaller than an inner diameter of the first cavity and smaller than an inner diameter of the lower ventilation hole.

7. The MEMS device as described in claim 1, wherein the upper diaphragm and the lower diaphragm are each made of an electric-conductive material.

8. The MEMS device as described in claim 1, wherein the upper diaphragm and the lower diaphragm are each comprises an insulation film provided with a conductive electrode layer.

9. The MEMS device as described in claim 1, wherein the upper diaphragm and the lower diaphragm are each comprises an insulation film with conducting areas formed by material doping or implantation.

10. The MEMS device as described in claim 1, wherein each of the supporting members comprises first arc sections that are concentrically arranged, the first arc sections are spaced apart from each other in an annular direction, the counter electrode is provided with through holes, the first arc sections are respectively accommodated in the through holes and are spaced apart from the counter electrode, and two ends of each of the first arc sections are connected to the upper diaphragm and the lower diaphragm.

11. The MEMS device as described in claim 10, wherein the upper ventilation hole, the first cavity, the lower ventilation hole each have the same shape as a corresponding first arc section of the first arc sections.

* * * * *